United States Patent [19]
Smith

[11] 3,825,326
[45] July 23, 1974

[54] INSTRUMENT FOR IMPROVED EYESIGHT-REFRACTION TESTING
[76] Inventor: Eastman Smith, Mountain Home, Ark. 72653
[22] Filed: May 18, 1972
[21] Appl. No.: 254,757

[52] U.S. Cl.................. 351/32, 351/26, 351/28, 351/34, 351/36, 351/37
[51] Int. Cl............................................. A61b 3/02
[58] Field of Search............ 351/32, 34, 36, 37, 17, 351/26, 28, 39

[56] References Cited
UNITED STATES PATENTS
3,574,450 4/1971 White .................................. 351/32
FOREIGN PATENTS OR APPLICATIONS
655,535 7/1951 Great Britain ....................... 351/36

Primary Examiner—Ronald L. Wibert
Assistant Examiner—Paul A. Sacher
Attorney, Agent, or Firm—Ray E. Snyder

[57] ABSTRACT
An instrument for eyesight-refraction testing, herein designated generically as an "Xactometer," employing optical targets with clearly recognizable details when focused which are positioned singly or repeated, or partially repeated at transverse or lateral intervals of angles, and also at the same time are repeated or partially repeated at longitudinal, or sight-axial, intervals of distances relative to the examined eye. The target elements preferably are of increasing or descreasing lateral size directly proportioned to the distances, with the effect that all similar target elements at whenever distances subtend closely, or exactly the same visual angles and thus appear to the eye as of the same size and appear assembled adjacently in the same lateral plane. Such transverse angular positions are either optionally fixed or manually rotatable, and such longitudinal distances are similarly either fixed or shiftable optically by eye-lens add-power or other lens power focusable, for the purpose of locating positions and distances of best recognition or optimum resolution in retinal imaging. The recognizable distances indicate the desired corrective lens sphere-power and cylinder power; while the transverse angles indicate the desired corrective lens cylindrical-axis.

5 Claims, 30 Drawing Figures

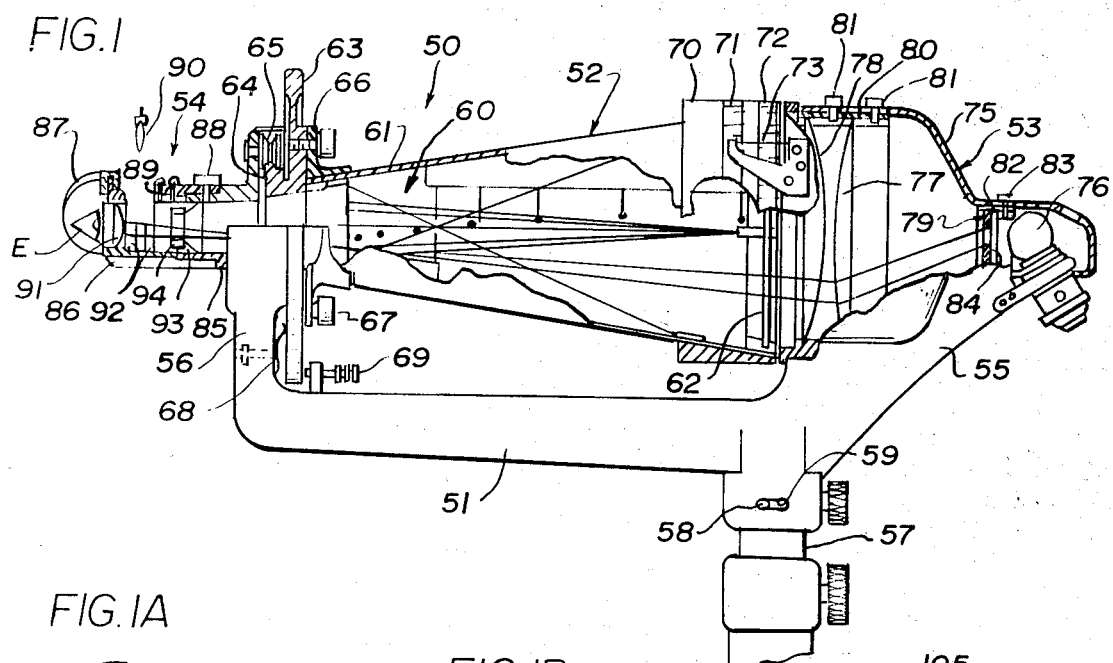
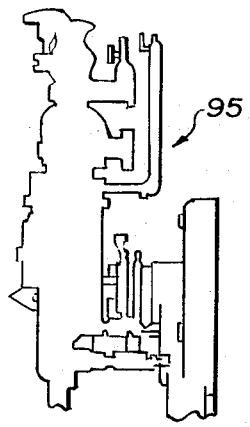
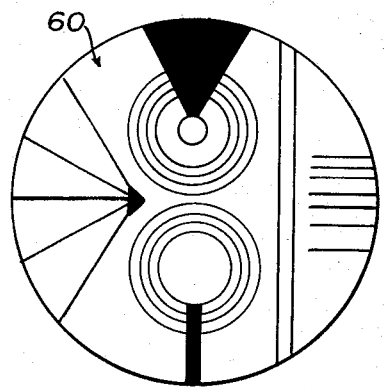
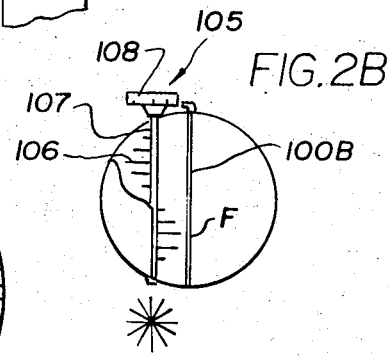
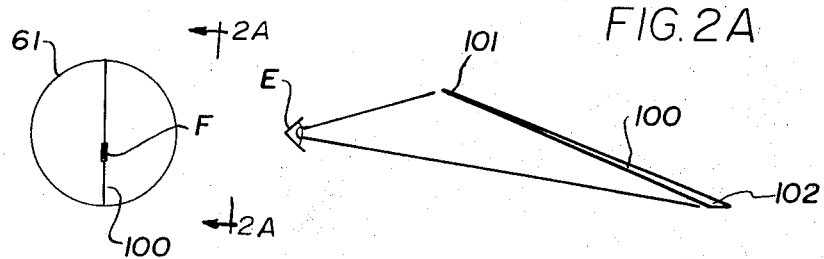

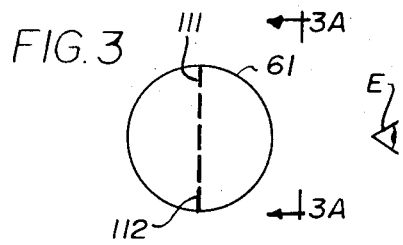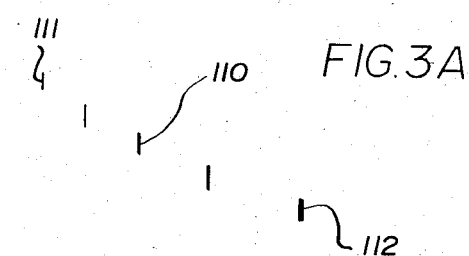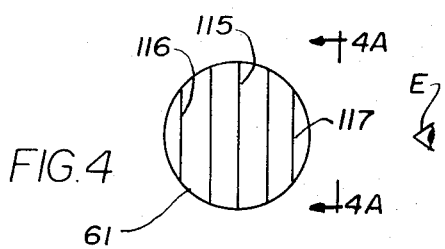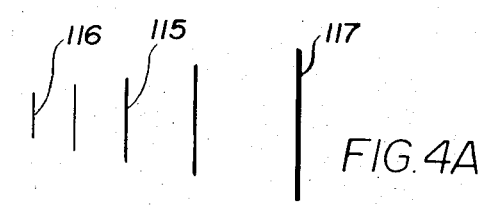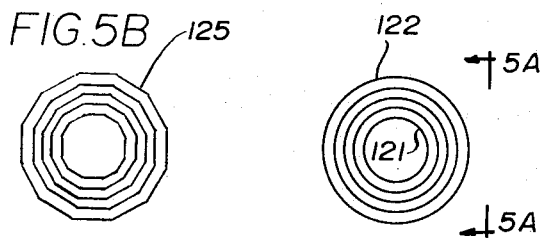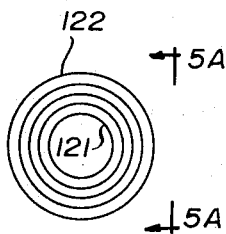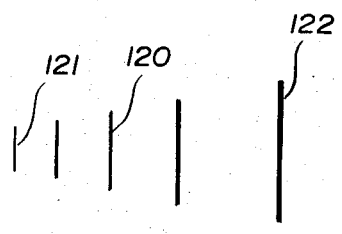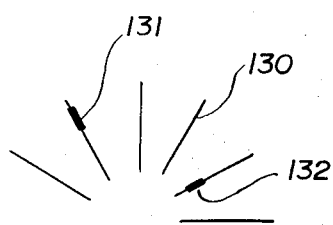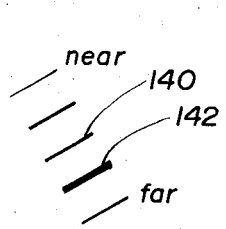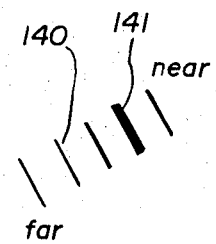

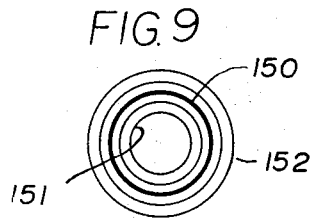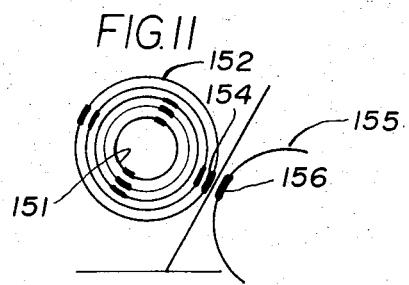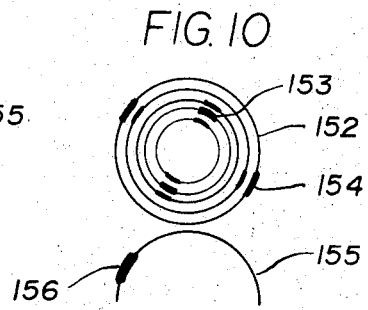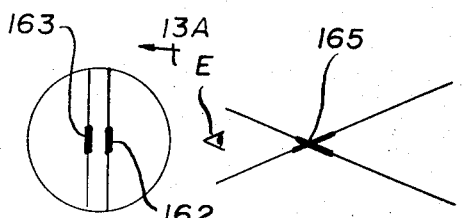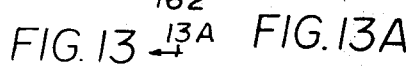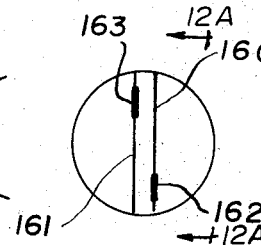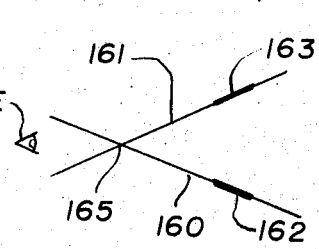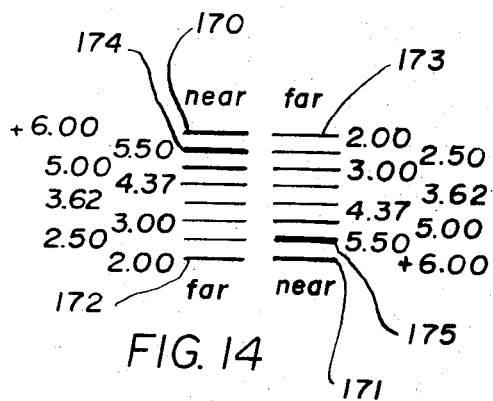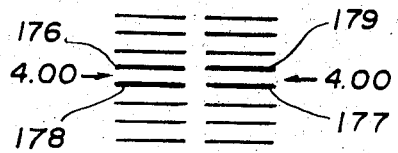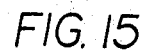

INSTRUMENT FOR IMPROVED EYESIGHT-REFRACTION TESTING

BACKGROUND OF THE INVENTION

1. Field of the Invention

This invention relates to the field of Optics, Eye Examining, Vision Testing and Correcting, and more particularly to Examining and Testing Instruments involving Subjective testing with plural target elements.

2. Description of the Prior Art

The human eye is, fundamentally, an optical recognition device. It is a physiologically elastic and pliable organ subject to a number of defects and prone to assume a variety of shapes and loss of focusing accommodation due to a number of factors, such as: fatigue, heredity, age, type of use, disease, and injury. Some of these defects may be improved by corrective lenses, provided the nature of the defect can be accurately measured. The method most commonly employed by Ophthalmologists and Optometrists to make such measurements is basically a trail and error process. The patient sits in a chair and gazes across a room at a chart or projection of letters of varying size. A series of lenses are placed in front of the patient's eyes until the letters appear in clearest focus. A prescription is then written by the Doctor for the lenses that seem to do the best job.

A number of instruments have been developed for the purpose of providing more objective measurement of some of these optical defects. For the most part, these instruments have been too cumbersome, uncertain, complicated, or ineffective to provide the proper measurements on which to base sufficiently accurate corrective prescriptions.

It is a primary object of the present invention to provide a simplified instrument for eyesight-refraction testing responsive to the subjective evaluation of the patient and effective to measure precisely the parameters on which an Eye Doctor can base a superior corrective prescription.

It is a more particular object to provide an instrument for eyesight-refraction testing comprising a series of axially spaced target elements of similar configuration, the details of which may appear to be of the same size to the eye of the observer, thus uniquely focusable for distance, and which may be rotated about an optical axis so as to measure sensitively any astigmatism that may exist in the eye of the observer.

Other objects may become apparent from the detailed description of the preferred embodiment herein.

BRIEF DESCRIPTION OF THE DRAWINGS

FIG. 1 is a longitudinal view, partially in section, of an embodiment of the instrument of the present invention;

FIG. 1A is an outline side view of a lens magazine attachment which may be utilized with the instrument of FIG. 1;

FIG. 1B is an eyepiece view of a plurality of target elements that may be contained within the instrument;

FIG. 2 is an eyepiece end view, as seen by the eye of an observer, of a single tapered target, designated as a "Lineax," which may be used within the instrument of FIG. 1;

FIG. 2A is a side view, taken on line 2A—2A of FIG. 2;

FIG. 2B is an alternative embodiment of the "Lineax" using a rotatable cursor to identify the point of focus;

FIG. 3 is an eyepiece end view of a plurality of transverse linear targets disposed along a common axis;

FIG. 3A is a side view, taken on line 3A—3A of FIG. 3;

FIG. 4 is an eyepiece view of a plurality of transverse linear targets or grid, designated as a "Focax," disposed in a parallel array apparently in one transverse plane;

FIG. 4A is a side view taken on line 4A—4A of FIG. 4;

FIG. 5 is an eyepiece view of a plurality of transverse circular target elements, designated as a "Loopax," disposed along a common axis;

FIG. 5A is a side view taken on line 5A—5A of FIG. 5;

FIG. 5B is a modification of FIG. 5 in which the circular targets are replaced by many sided polygons;

FIG. 6 is an eyepiece view of a plurality of "Lineax" target elements disposed in a radial array and illustrating symbolically the effect of astigmatism;

FIGS. 7 & 8 are schematic representations of the "Focax" of FIG. 4 illustrating the effect of rotation when astigmatism exists in the eye of the observer;

FIG. 9 is a schematic representation of the "Loopax" of FIG. 5 as seen by an observer with no astigmatism;

FIG. 10 is a schematic representation of the "Loopax" of FIG. 5 as might be seen by an observing eye with astigmatism and also showing an adjacent loop of opposing curvature;

FIG. 11 is a schematic representation of FIG. 10 rotated so as to define an astigmatic axis;

FIG. 12 is an eyepiece end view of a dual crossed "Lineax;"

FIG. 12A is a side view taken on line 12A—12A of FIG. 12;

FIG. 13 is an eyepiece view of the dual crossed "Lineax" when a corrective lens has been added;

FIG. 13A is a side view taken on line 13A—13A of FIG. 13.

FIGS. 14 & 15 are double, crossed "Focaxes" similar to the "Lineaxes" of FIGS. 12 & 13;

DESCRIPTION OF THE PREFERRED EMBODIMENT

Figure 16:
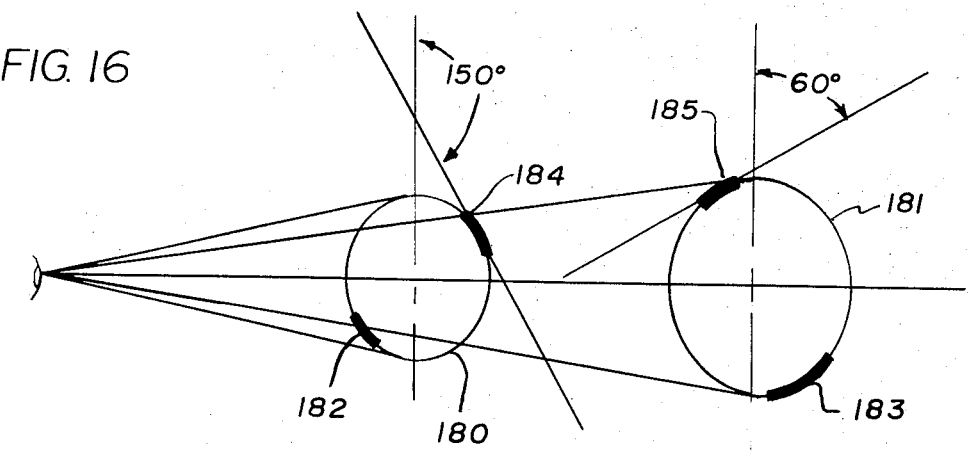
FIG. 16 is a diagrammatic representation of a portion of a "Loopax" as seen by an astigmatic eye and illustrating the measurable effect of the two cylindrical axes.

The eyesight-refraction testing instrument of the present invention is designated generally by the numeral 50 and comprises: a mounting frame 51, a conical housing 52 containing the target elements, a collimating light section or source 53, and an eyepiece section 54. The frame 51 is generally in the shape of a yoke and supports the light section 53 with one arm 55 and the eyepiece section 54 with the other arm 56. The housing 52 is mounted to rotate about a horizontal axis between the light section 53 and the eyepiece section 54. The frame 51 is also mounted to pivot about a vertical axis on an upright post 57. The arcuate movement about the vertical axis is limited to correspond to the interpupilary distance of the eyes of an observer, the motion being limited by a pin 58 disposed in a slot 59 formed in the frame 51.

The conical housing 52 contains a plurality of target elements 60, which will be described in greater detail hereinafter, and comprises an opaque outer shell or wall 61, a circular transparent end wall 62 adjacent the light source 53, and a hand control wheel 63 for rotating the housing 52. The wheel 63 has an integral beveled hub 64 which is captured by radially spaced roller spools 65 mounted on the arm 56. The shell 61 is rigidly attached to the wheel 63 by means of a flanged collar 66 and thumb screws 67. An adjustable leaf spring drag control 68 is mounted on the arm 56 and bears against the wheel 63. A pin stop 69 is also mounted on the arm 56 and is mounted so as to engage the hand wheel 63 and retain it in a desired position.

A graduated cylindrical scale drum 70 is rigidly attached to the shell 61 adjacent the light source 53. The scale 70 is graduated in degrees and has at least two sets of indicating numbers 71 and 72; the numerals being inverted with respect to each other to provide reading from opposite sides of the instrument 50.

A fixed indicator line 73 is attached to or positioned by the light section 53 on one side and oriented to read the numbers from the scale 72. A comparable indicator line (not shown) may be mounted on the opposite side of the light section 53 for reading scale 71.

The light section 53 comprises a housing 75, a lamp 76, and a pair of condensing lenses 77 and 78. A light-aperture stop 79 is mounted within the housing 75 adjacent to the lamp 76 and between the lamp 76 and lenses 77 and 78. The lenses 77 and 78 are mounted within a sliding tube 80 and can be moved longitudinally within the housing 75 by focusing knobs 81. The aperture stop 79 may be contained within a sliding tube 82 which can be moved longitudinally by a focusing knob 83. A small translucent diffusing screen 84 is also contained within tube 82 between the aperture stop 79 and lamp 76.

The eyepiece section 54 comprises a fixed sight tube 85 attached to or formed integrally with the arm 56, a demountable lens housing 86, and a light shield 87. The lens housing 86 is attached to the sight tube 85 by means of a release pin 88, and is formed on its upper side with an access slot 89 adapted to receive test lenses 90. The lens housing 86 contains a fixed eyepiece lens 91, and lens sockets 92 for retaining the test lenses 90. A first field aperture 93 and a bumper ring 94 are mounted within the sight tube 85 and extend into the lens housing 86. The light shield 87 is attached to the lens housing 86 and is adapted to shield the eye (and both eyes) of a patient, designated by the letter E.

As an alternative embodiment, the lens housing 86 may be replaced by a conventional lens magazine 95 shown in outline form in FIG. 1A.

Referring to FIG. 1B, there is shown a plurality of target elements 60, some or all of which may be contained within the housing 52 at one time. If all were present at one time, this FIG. represents the field of view to the observer at E. The various target elements 60, and their utility in the present invention, will now be described in detail.

CHARACTERISTICS AND USE OF THE INSTRUMENT

The simplest form of target 60 is designated herein by the numeral 100 and is called a "Lineax" and is shown in FIGS. 2 and 2A. The Lineax 100 is actually a rigid preferably tapered rod, filament, or strip, presented at an angle to the axis of the line of sight of observer E. The narrower end 101 of the target 100 is closest to the Observer E and the wider end 102 is farthest away so that the Lineax element appears to be of constant width. The length of the target 100 is sufficiently long as to permit the eye E of the observer to include a relatively large field of view. Some location F, or short portion, along the length of the target 100 will appear in sharp focus to the observer, and the remainder of the length on either side of the location F will appear grey of fuzzy. The location F of sharpest focus can be caused to move along the length of target 100 by inserting different test lenses 90 into the slot 89 of the eyepiece section 54.

A convenient device for positively identifying the position of F on the Lineax 100B is illustrated in FIG. 2B. The device is cursor 105 in the form of a helical array of radial spokes 106 extending outwardly from a central rod 107. The rod 107 is positioned transversely to appear parallel to the Lineax 100B and may be rotated by a graduated dial knob 108. Turning the knob 108 through 360° of rotation produces one complete cycle of the helical spokes 106. The knob 108 may be turned by either the Eye Doctor or the patient, until the patient determines the point of clearest focus with one of the spokes 106 aligned with this point. By noting the angular position on the knob 108, the Doctor can determine positively the point of focus F for the particular patient.

A modification of the Lineax of FIG. 2 is illustrated in FIGS. 3 and 3A. In this illustration, the target elements are a plurality of short linear segments 110 disposed transversely to the axis of the conical housing 52, and presented at an angle in a staggered array along a path similar to the Lineax of FIG. 2. The segment 111 nearest to the observer is smaller in diameter than the successive segments, and the segment 112 farthest away from the observer is the largest in diameter. To the observer at E, the array of targets 110 may appear as a segmented Lineax and almost continuous in extent. The segments 110 are spaced at convenient lens power distances and only one will appear in clear focus to the observer for a particular corrective test lens 90.

It should be noted that, for a normal (emmetropic) eye, there is one distance and one point F of very best focus along the Lineax 100, or one target element 110, depending on the calibrated test lens 90 chosen. Some other eye would focus at some other distance, and the discrepancy is to be made up by the prescriptive lens 90 that will bring this eye back to normal. When the patient desires special vocational glasses, e.g. for reading, or driving, additional positive or negative "sphere" values are specified, as added to the above test-lens 90 valves. When the regular test readings have been completed, the Refractionist takes into account the usage factors of the patient in making his prescription based on the test lenses 90 employed.

In FIGS. 4 and 4A, the target elements 115 are presented in the form of a grid of transverse, full length, linear segments 115. The target array illustrated is designated herein as a "Focax." The target elements 115 are successively greater in diameter, the smallest 116 being nearest to the observer at E, and the largest 117 being most distant. The segments 115 are oriented transversely to the axis of the conical housing 52 and are spaced at convenient lens power distances away from the observer E. The diameters of the elements 115, and their distances from E are predetermined so as to present a grid of apparent parallel, equally spaced, equal diameter linear segments. However, only one of the target elements 115 will appear in clear focus to the unaided eye at one time, or to an eye aided by a particular test lens 90.

FIGS. 5 and 5A illustrate still another embodiment of the invention wherein the target elements are in the form of apparent concentric circles 120. The circular target elements 120 are disposed normal to the axis of the instrument, or to the line of sight, at convenient lens power distances along the axis. The rim thickness of successive elements 120 increases so that the array presented appears to be a group of concentric circles all lying in the same plane. However, only one of the circles 120 will appear in clear focus at one time.

FIG. 5B represents a modification to the array of FIG. 5 wherein the circles are replaced by an array of multi-sided polygons 125. To some observers, this array offers some psychological advantages, and to an observer E afflicted with astigmatism, it makes easier the method of prescribing corrective lenses for the astigmatism, as will be described more completely hereinafter.

It should be noted that, in the astigmatic eye, the normal spherical curvature of the eye is deformed so as to define two substantially cylindrical surfaces of curvature. The orientations of the axes of the cylindrical surfaces are generally 90° apart. The radii for these two surfaces are different, and the point of clearest focus, therefore, is different for each cylindrical lens. The target elements 60 described heretofore, or a plurality of such target elements, may be employed to measure for astigmatism, as will be described hereafter.

FIG. 6 is a schematic illustration of a plurality of Lineaxes 130 disposed in a radial array. For the astigmatic eye E, one of the Lineaxes 130 will be more or less parallel with one of the cylindrical axes of the eye. A second Lineax 130, oriented at 90° to the first will be more or less paralled with the second cylindrical axis of the eye. Since the radii of curvature of the two cylindrical surfaces are different, the points or ranges of clearest focus along the Lineaxes will differ. The point of clearest focus for one cylindrical surface is shown symbolically at 131. For the second cylindrical surface, the point of clearest focus is shown at 132 at a more remote distance from the observer E. This radial array of Lineaxes is especially useful for the approximate quick location of the two foci for astigmatism; and, by slight rotation of the shell 52, the angles can be determined more precisely.

Somewhat the same phenomena as described above can be observed by the astigmatic eye using the Focax of FIG. 4. FIGS. 7 and 8 give a schematic representation of this. These FIGS. illustrate a plurality of target elements 140. When the housing 52 is rotated to the angular position shown in FIG. 7, the target 142 is in clearest focus. It should be noted that this is substantially the same orientation as the Lineax 132 of FIG. 6. Rotation of the shell 52 by 90° brings the target element 141 into clearest focus. This is comparable to the position of the Lineax 131 of FIG. 6. The Focax thus is effective to measure the orientation of the two astigmatic axes as well as the focal lengths of the two cylindrical surfaces according to the positions of the determined target elements 140.

The Loopax of FIG. 5 may be utilized for the measurement of desired spherical lens correction as well as for astigmatism. In the view of the Loopax, shown in FIG. 9, one of the loops 150 will be in clearest focus for a normal eye without astigmatism. If only spherical correction is required, test lenses 90 are inserted, or selected from the magazine 95, until the desired loop 150 appears in clear focus.

When astigmatism is present in the eye of the observer, as shown in FIGS. 10 and 11, also 16 and 17, the nearer loop or loops 151 will appear in clearer focus along some arc whose tangent is at 153, while a farther loop or loops 152 will appear in clearer focus at 154 along an arc whose tangent is normal to the first. The visual position of these points of focus 153 and 154 does not change with rotation of the housing 52. The determination of the axes of astigmatism may be measured by employing a circular arcuate loop 155 of opposed curvature mounted within the shell 52, and adjacent to the outer or optionally farther loop 152. Some segment 156 of the loop 155 will appear in clearest focus. Rotation of the shell 52 will cause this focused segment 156 apparently to move along the loop 155 until it is parallel to, or at its point of closest approach to, the point 154. This position of the shell 52 can be noted on the scales 71 or 72 to identify one axis of astigmatism. The other axis, of nearer focus, at 153 is normal to this measurement. According to conventional practice in correction, the point of nearer focus is caused to be moved to the plane of farther focus by the addition of the proper "cylinder power" lens oriented with its axis of curvature parallel to the axis or tangent along 153. This results in a compromise condition wherein the farther loop 154 appears almost uniformly dark or clear, comparable to that seen by an eye without astigmatism. This condition is illustrated schematically in FIGS. 16 and 17.

Another embodiment of the invention is illustrated in FIGS. 12 and 12A, and 13 and 13A, wherein a pair of crossed Lineaxes 160 and 161 are employed. These Lineaxes appear to be parallel in space, to the observer at E. In this orientation, two points or segments of clearest focus 162 and 163 appear equally displaced above and below the central horizontal axis. The desired points of focus for a normal eye are by the central axis or side-view intersection 165 where the Lineaxes 160 and 161 cross. The points of focus can be brought to this intersection 165 by the addition of the proper spherical test lens 90.

In an observing eye afflicted with astigmatism, there will be two transverse-angular target positions for which the pair of Lineax segments or streaks can be seen clearly. In the one angular position, the pair of visual displacements will be more widely separated than they are in the other angular position, which will be at approximately 90 degrees from the first. Or they may be found separated in the opposite directions, along the two crossed lines. To bring them to the desired intersection coincidence, different amounts of positive or negative testing sphere power lenses 90 are required for the two angular positions. These two powers correspond to the two focal lengths of the cylindrical error in the astigmatic eye. Now, the algebraic difference of these two sphere powers is the required cylinder power for prescriptive correction. This arrangement of the Lineax affords quick and accurate readings for determining the spherical and cylindrical corrective values.

The embodiment illustrated in FIGS. 14 and 15 is a further refinement demonstrating the versatility of the present invention and showing a pair of crossed "Focaxes" substituted for the crossed "Lineaxes" of FIGS. 12 and 13. This embodiment permits still greater refinement in accuracy by employing sets of target elements positioned at points corresponding to certain convenient dioptric values. In FIG. 14, the nearest target elements 170 and 171, respectively, of the two Focaxes are shown positioned at points corresponding to +6.00 diopters, and the most remote elements 172 and 173 are at +2.00 diopters. If the fixed eyepiece lens 91 is set for a normal focal value of +4.00 diopters, for example, then any ametropic eye may require the addition of corrective lens values to bring it into focus at the same +4.00 location after a suitable rotation.

As an example, the target elements 174 and 175 may appear in clearest focus to the eye of a particular observer. As shown in FIG. 14, these elements are each at distances corresponding to +5.50 diopters. Additional lenses 90 are then added until, as in FIG. 15, the target elements 176 and 178, and 177 and 179, appear in balanced focus. When these elements appear in balance, the eye is in focus at +4.00 diopters. This instrument eliminates the need for the patient to remember which test lenses 90 appeared to give him best focus. The comparative effects of the test lenses 90 are shown simultaneously, side-by-side, for the patient's immediate choice.

Figure 17:
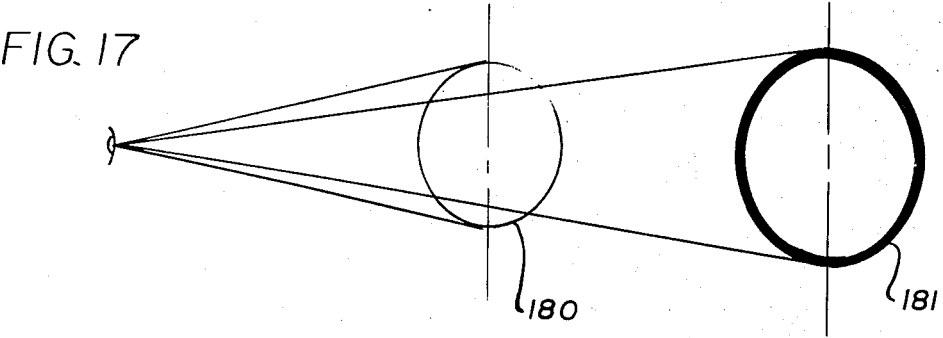
FIG. 17 is a diagrammatic representation of a portion of a "Loopax" as seen by a non-astigmatic eye, and as corrected by appropriate lenses.

Referring now to FIGS. 16 and 17, the effects of astigmatism will be described in greater detail. Two elements 180 and 181 of a Loopax are shown for convenience of illustration. As mentioned above, astigmatism is a condition characterized by a slightly cylindrical deformation of the cornea. The deformation of the normally spherical cornea actually forms two cylindrical surfaces of different radii of curvature having their axes normal to each other. The cylindrical surface of lesser curvature and with the more remote focus might cause the target element 181 to appear in sharpest focus at the diametrically opposed points 183 and 185. The other cylindrical surface, being more strongly curved, will focus closer than will the less curved surface. This might cause the points 182 and 184 of the target 180 to appear in sharpest focus. The readings on the scales 71 or 72 by means of the indicator 73 will verify that the orientations of the points of clearest focus on the elements 180 and 181 are usually or closely 90° apart.

The astigmatic condition is corrected by prescribing a lens having cylindrical curvature of the proper power aligned with the short axis of curvature of the cornea so as to equalize with the curvature of the long axis. The proper "cylinder" power is the negative difference in spherical lens powers corresponding to the distance between the two loops 180 and 181. This should result in a corrected condition where the target element 181 appears almost uniformly in sharp focus, as shown in FIG. 17. If the loop 181 is not at the normal distance for the standard eye lens 91, then some spherical correction may also be prescribed.

Figure 18:
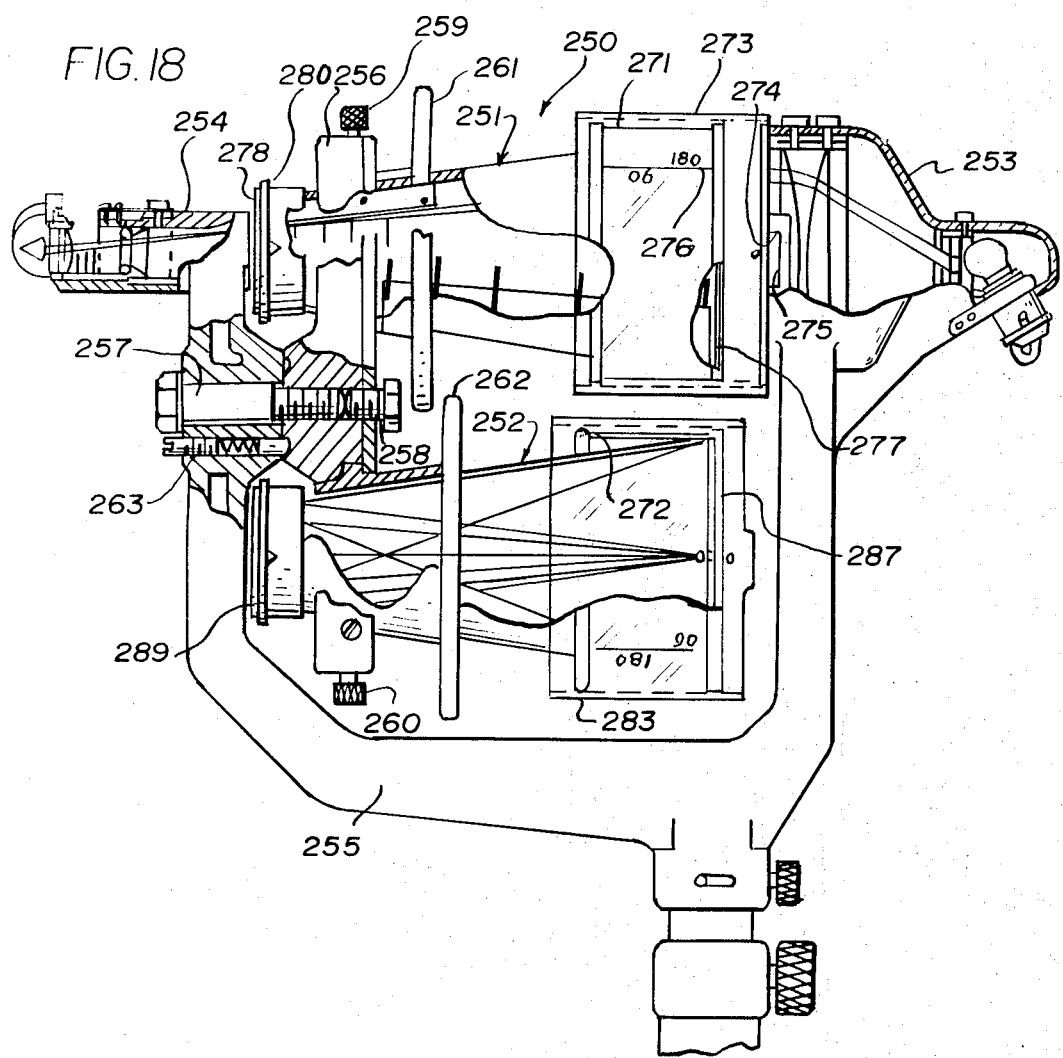
FIG. 18 is a side view, partially in section, of a more complete embodiment of the instrument of FIG. 1.

An alternative embodiment of the invention is illustrated in FIG. 18 which may be more comprehensive in use or more convenient for some refractionists. This embodiment segregates some of the parameters that the refractionist wishes to measure and provides confirmation of the measurements taken in more than one way.

The instrument of FIG. 18 is designated by the numeral 250 and comprises a pair of rotatable target housings 251 and 252, a common lamp housing 253, and a common eyepiece section 254. The lamp housing 253 and eyepiece section 254 are mounted directly on a common yoke 255, and the target housings 251 and 252 are carried by a rotatable arm 256, also mounted on the yoke 255 by means of a bearing pin 257 and bolt 258. The housings 251 and 252 are mounted to rotate with respect to the arm 256 about parallel horizontal axes and may be retained in a desired angular position by respective lock screws 259 and 260. Handwheels 261 and 262 are provided for rotating the respective target housings 251 and 252.

The instrument 250 is illustrated with the target housing 251 interposed between the light source 253 and eyepiece section 254. The target housing 252 in interchanged with the housing 251 by rotating the arm 256 through 180°. A spring-loaded detent 263 holds the arm 256 in one or the other of the two selective positions.

Each of the target housings 251 and 252 has a scale drum, 271 and 272, respectively. A transparent cylindrical shell 273 surrounds the drum 271 and is formed with an axially extending tongue 274. The shell 273 is adapted to be moved axially with respect to the drum 271, and the tongue 274 engages a locking groove 275 formed in the lamp housing 253. This causes the shell 273 to remain stationary as the drum 271 is rotated within it. The shell 273 carries an etched or imprinted indicator line 276 for reading the angular displacement of the drum 271. (A counterpart indicator line, not shown, may also be provided on the opposite side of the instrument.) Inside the shell, the housing 251 is dust-sealed and protected by a transparent window 277 at the large end; while at the small end of the housing, closure is by a rotatable, transparent end window 278, which carries an indicator dot or marker 279 (shown in FIG. 18A). The end window 278 is turned by a graduated outer knurled, or finger-grip annulus 280.

Figure 18A:
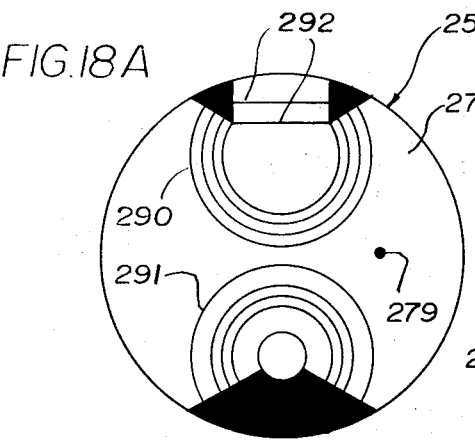
FIG. 18A is an eyepiece view of a double opposed "Loopax" and including two elements of a "Focax," and a rotatable indicator.
Figure 18B:
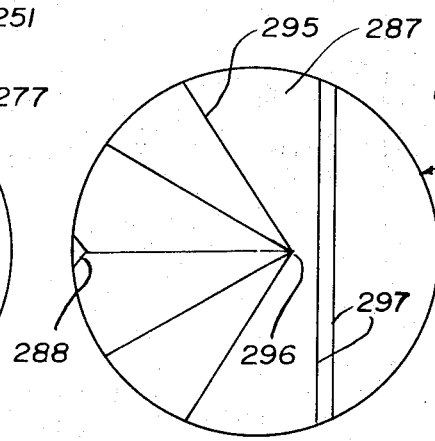
FIG. 18B is an eyepiece view of a plurality of radiating "Lineaxes," with indicator, and including a pair of crossed "Lineaxes."

Similarly, the target housing 252 carries a transparent outer shell 283 and has a large end window 287 and a rotatable small end window 289 which carries an arrow or pointer indicator 288 (shown in FIG. 18B). While these markers, 279 and 288, can be in more general average focus if positioned at some intermediate location within the housing instead of at the near or small end of the housing, and preferentially at or close to the focal point of the standard eye lens 91, yet they are visible and their positioning can be definitely noted, for communication between patient and doctor. For the younger patients, with greater focal accommodation, a possible preference could be location at the far end, or large window, in order to assure relaxation.

Referring now to FIGS. 18A and 18B, there is illustrated an eyepiece end view of the target elements contained within the housings 251 and 252, respectively. Within 251 there are segments of two opposed Loopaxes 290 and 291, and two elements 292 of a Focax. Within 252 are a plurality of Lineaxes 295 radiating from a point 296 conveniently off-center from the optical axis of the instrument, and a pair of crossed Lineaxes 297.

The Loopaxes 290 and 291 operate as previously described to determine the Loop of clearest focus along the axis of the instrument. Similarly, if astigmatism is present in the eye of the observer, the housing 251 is rotated about its central axis until the points or streaks of clearest focus on the opposed Loops 290 and 291 are at their mutually closest approach. To indicate to the refractionist the Loop of clearest focus, the patient may rotate the window 278 until the particular Loop 290 or 291 overlaps the indicator dot 279. The measurement of the particular Loop 290 or 291 may be checked by the balance of focus of the Focax elements 292. These two elements 292 of the Focax may correspond to the two central elements 176 and 178, or 177 and 179, shown in FIG. 15.

The measurements taken using the housing 251 may be checked against those obtained by using the housing 252. The radiating Lineaxes 295 and the crossed Lineaxes 297 should measure substantially the same lens values for proper focus, rotating the housing 252 if necessary to account for astigmatism and balancing to lines 295.

It should be noted that the use of both target housings 251 and 252 provides complete coverage of the measurements the refractionist may wish to make, for spherical and for astigmatic focus. The Lineaxes are continuous as to axial or longitudinal displacement and thus provide an unlimited number of possible points of focus, but when locked against rotation provide only a discrete number of angular positions. Similarly, the Loopaxes provide only a discrete number of axial positions, but an infinite number of possible angular positions.

The flexibility and precision of this instrument thus is unmatched by any comparable instrument known in the art.

The embodiments shown and described are by way of example only, and it is to be understood that many modifications may be made without departing from the spirit of the invention. The invention is limited only as defined by the claims.

I claim:

1. An optometric instrument, having at least one pre-determined optic axis, for testing the eyesight-refraction and astigmatic condition in an eye of an observer comprising:

a rotatable housing having an axis of rotation;

a first array of short spaced and parallel linear target elements mounted for viewing within said housing wherein each of said linear target elements extends transversely to and at calibrated spaced distances along the optic axis and wherein each of said elements of said array is so dimensioned that said array appears to the observer as a grid of equally dimensioned parallel elements;

a second array of target elements substantially identical to said first array and mounted within said housing in a substantially identical manner to said first array, but with spacially crossed non-overlapping orientation with respect to said first array;

means for rotating said housing;

means for measuring the degree of rotation of said housing about said axis of rotation for measuring the axes of astigmatism;

means for uniformly illuminating said target arrays;

eyepiece means for allowing the observer to view said target arrays; and means for inserting different lenses of varying power before the eye of the observer for correcting refractive error and astigmatism, said refractive error existing where one target element of each array at the same axial distance appears to the observer to be in clearest focus, rather than some pre-determined element for normal vision, and said astigmatism existing where target elements of each array appear to the observer in clearest focus at different axial distances as said housing is rotated.

2. An optometric instrument, having at least one pre-determined optic axis, for testing the eyesight-refraction and astigmatic condition in an eye of an observer and comprising:

an array of a plurality of spaced and parallel target elements in the form of arcuate segments of successively increasing diameter mounted for viewing at calibrated spaced distances along the optic axis and wherein each of said elements extends transversely to the optic axis and is so dimensioned that said array appears to the observer as an array of parallel concentric circles;

at least one additional target element in the form of an arcuate segment of opposed curvature mounted parallel to one target element of said array and at the same axial distance from the eye of the observer;

a rotatable housing for containing said target elements and mounted for rotation about a horizontal axis;

means for rotating said housing;

means for measuring the degree of rotation of said housing about said axis of rotation for measuring the axes of astigmatism;

means for uniformly illuminating said target elements;

eyepiece means for allowing the observer to view said target elements; and means for inserting different lenses of varying power before the eye of the observer for correcting refractive error and astigmatism, said refractive error existing where one target element of said array, other than some pre-determined normal element, appears to the observer to be uniformly in focus, and said astigmatism existing where short segments of different target elements appear in clearest focus to the observer at different axial distances from the eye of the observer, and the relative position of said segments of clearest focus remaining stationary as said housing is rotated.

3. The instrument of claim 2 including:

a second array of a plurality of spaced and parallel target elements in the form of arcuate segments of successively decreasing diameter mounted for viewing at calibrated spaced distances along a second optic axis and wherein each of said elements extends transversely to said second optic axis and is so dimensioned that said array appears to the observer as an array of parallel concentric circles; and said one additional target element of opposed curvature is an element of said second array.

4. An optometric instrument, having at least one predetermined optic axis, for testing the eyesight-refraction and astigmatic condition in an eye of an observer and comprising:
- a first continuous linear target element mounted for viewing by the observer in a plane parallel to the optic axis and presented to the observer at an acute angle to the optic axis and having a length extending over a field of view of several diopters;
- a second substantially identical continuous linear target element mounted for viewing by the observer in a plane parallel to the optic axis and to said first plane and presented to the observer in a spacially crossed orientation with respect to said first target element and extending over the same field of view;
- a rotatable housing for containing said target elements and mounted for rotation about a horizontal axis;
- means for rotating said housing about said horizontal axis;
- means for measuring the degree of rotation of said housing about said horizontal axis for measuring the axes of astigmatism;
- means for uniformly illuminating said target elements;
- eyepiece means for allowing the observer to view said target elements; and
- means for inserting different lenses of varying power before the eye of the observer for correcting refractive error and astigmatism, said refractive error existing where a short section of each of said target elements appears in clearest focus at some point along the length of each element, other than at the point of closest intersection, and said astigmatism existing where said sections of clearest focus of each element appear at different axially spaced distances along said elements as said housing is rotated about the horizontal axis.

5. An optometric instrument, having at least one predetermined optic axis, for testing the eyesight-refraction and astigmatic condition in an eye of an observer and comprising:
- a housing mounted for rotation about a horizontal axis;
- a plurality of substantially identical elongated linear target elements mounted within said housing for viewing by the observer, said target elements being presented to the observer at an angle with respect to the optic axis in an apparent radial array and having lengths extending over a measurable field of view of several diopters;
- means for rotating said housing about said horizontal axis;
- means for measuring the degree of rotation of said housing about said horizontal axis for measuring the axes of astigmatism;
- means for uniformly illuminating said target elements;
- eyepiece means for allowing the observer to view said target elements; and
- means for inserting different lenses of varying power before the eye of the observer for correcting refractive error and astigmatism, said refractive error existing where short sections of each of said target elements appear in clearest focus at some point along the length of each element, and said astigmatism existing where said sections of clearest focus appear at different axially spaced distances along some of said target elements.

* * * * *